United States Patent
Knittel et al.

(10) Patent No.: US 12,337,528 B2
(45) Date of Patent: Jun. 24, 2025

(54) METHOD FOR PRODUCING A PART BY SELECTIVE MELTING OF POWDER

(71) Applicant: SAFRAN AIRCRAFT ENGINES, Paris (FR)

(72) Inventors: Stephane Knittel, Moissy-Cramayel (FR); Pascal Fabrice Bilhe, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 143 days.

(21) Appl. No.: 15/102,087

(22) PCT Filed: Dec. 4, 2014

(86) PCT No.: PCT/FR2014/053169
§ 371 (c)(1),
(2) Date: Jun. 6, 2016

(87) PCT Pub. No.: WO2015/082853
PCT Pub. Date: Jun. 11, 2015

(65) Prior Publication Data
US 2016/0305256 A1    Oct. 20, 2016

(30) Foreign Application Priority Data
Dec. 6, 2013   (FR) ...................... 1362253

(51) Int. Cl.
*B29C 64/153* (2017.01)
*B22F 3/10* (2006.01)
(Continued)

(52) U.S. Cl.
CPC .......... *B29C 64/153* (2017.08); *B22F 3/1039* (2013.01); *B22F 3/23* (2013.01);
(Continued)

(58) Field of Classification Search
CPC ........ C23C 33/02; B23K 15/00; B23K 26/08; B23K 15/0086; B23K 15/0093;
(Continued)

(56) References Cited

U.S. PATENT DOCUMENTS 3,672,849 A * 6/1972 Bredzs .................... C22C 1/058
                                                                         428/209
4,917,964 A * 4/1990 Moshier .............. C22C 32/0073
                                                                         428/614
(Continued)

FOREIGN PATENT DOCUMENTS

CN            1603031 A      4/2005
CN          101309766 A     11/2008
(Continued)

OTHER PUBLICATIONS

Combined Office Action and Search Report issued May 18, 2017 in Chinese Patent Application No. 201480066274.9 (with English translation).
(Continued)

*Primary Examiner* — Hung D Nguyen
*Assistant Examiner* — Thao Uyen Tran-Le
(74) *Attorney, Agent, or Firm* — Oblon, McClelland, Maier & Neustadt, L.L.P.

(57) ABSTRACT

A method of fabricating a part by selectively melting powder is provided. The method includes: depositing a first layer of a first powder having a first element as its main element; depositing, on the first layer, a second layer of a second powder having a second element as its main element, which second element is different from the first element; and moving a first energy beam over the second layer, the energy delivered by the first beam serving to initiate an exothermic reaction between the first element and the second element, (Continued)

the energy given off by the exothermic reaction acting to locally melt together the first and second layers.

14 Claims, 1 Drawing Sheet

(51) Int. Cl.
| | |
|---|---|
| B22F 3/23 | (2006.01) |
| B22F 10/28 | (2021.01) |
| B23K 15/00 | (2006.01) |
| B23K 26/00 | (2014.01) |
| B23K 26/342 | (2014.01) |
| B33Y 10/00 | (2015.01) |
| B33Y 80/00 | (2015.01) |
| C22C 1/047 | (2023.01) |
| C22C 1/05 | (2023.01) |
| C22C 32/00 | (2006.01) |
| F01D 5/28 | (2006.01) |
| B22F 5/00 | (2006.01) |
| B22F 5/04 | (2006.01) |
| B22F 12/63 | (2021.01) |
| B23K 101/00 | (2006.01) |
| B23K 103/08 | (2006.01) |
| B23K 103/10 | (2006.01) |
| B23K 103/14 | (2006.01) |

(52) U.S. Cl.
CPC .......... *B22F 10/28* (2021.01); *B23K 15/0086* (2013.01); *B23K 15/0093* (2013.01); *B23K 26/0006* (2013.01); *B23K 26/342* (2015.10); *B33Y 10/00* (2014.12); *B33Y 80/00* (2014.12); *C22C 1/047* (2023.01); *C22C 1/058* (2013.01); *C22C 32/0078* (2013.01); *F01D 5/28* (2013.01); *B22F 5/009* (2013.01); *B22F 5/04* (2013.01); *B22F 12/63* (2021.01); *B23K 2101/001* (2018.08); *B23K 2103/08* (2018.08); *B23K 2103/10* (2018.08); *B23K 2103/14* (2018.08); *F05D 2220/323* (2013.01); *F05D 2230/233* (2013.01); *F05D 2230/234* (2013.01); *F05D 2230/31* (2013.01); *F05D 2300/11* (2013.01); *F05D 2300/121* (2013.01); *F05D 2300/131* (2013.01); *F05D 2300/132* (2013.01); *Y02P 10/25* (2015.11)

(58) Field of Classification Search
CPC .............. B23K 26/0006; B23K 26/342; B23K 2101/001; B23K 2103/08; B23K 2103/10; B23K 2103/14; B33Y 00/00; B33Y 40/00; B33Y 10/00; B33Y 80/00; H01L 21/681; F01D 5/28; B29C 64/153; B29C 64/141; B22F 3/1039; B22F 3/23; B22F 10/28; B22F 5/009; B22F 5/04; B22F 12/63; B22F 10/00; C22C 1/047; C22C 1/058; C22C 32/0078; C22C 1/04; F05D 2220/323; F05D 2230/233; F05D 2230/234; F05D 2230/31; F05D 2300/11; F05D 2300/121; F05D 2300/131; F05D 2300/132; Y02P 10/25

See application file for complete search history.

(56) References Cited

U.S. PATENT DOCUMENTS

| | | | | |
|---|---|---|---|---|
| 5,071,054 A | * | 12/1991 | Dzugan | B23K 20/021 228/119 |
| 5,156,697 A | * | 10/1992 | Bourell | B29C 64/153 264/497 |
| 5,182,170 A | * | 1/1993 | Marcus | B33Y 10/00 264/497 |
| 5,459,018 A | * | 10/1995 | Akahira | G11B 7/243 |
| 6,376,148 B1 | * | 4/2002 | Liu | B29C 64/40 156/273.1 |
| 6,401,001 B1 | * | 6/2002 | Jang | B33Y 50/02 204/192.15 |
| 2003/0059334 A1 | * | 3/2003 | Shen | B33Y 10/00 419/44 |
| 2004/0228754 A1 | * | 11/2004 | Abe | B22F 3/004 419/6 |
| 2005/0112015 A1 | * | 5/2005 | Bampton | B22F 1/0003 419/5 |
| 2006/0153728 A1 | | 7/2006 | Schoenung et al. | |
| 2011/0180311 A1 | * | 7/2011 | Tsuda | C22C 13/00 420/560 |
| 2011/0190904 A1 | * | 8/2011 | Lechmann | A61F 2/3094 623/23.61 |
| 2012/0018115 A1 | * | 1/2012 | Hovel | B22F 3/1055 164/493 |
| 2012/0231159 A1 | * | 9/2012 | Weihs | B22F 3/23 427/201 |
| 2013/0015609 A1 | * | 1/2013 | Landau | B33Y 10/00 264/497 |
| 2014/0035205 A1 | * | 2/2014 | Hagiwara | B29C 67/0077 264/497 |
| 2014/0349132 A1 | * | 11/2014 | Uhlmann | B28B 11/24 428/137 |
| 2014/0373681 A1 | * | 12/2014 | Yamazaki | C22C 27/04 75/255 |
| 2015/0034604 A1 | * | 2/2015 | Subramanian | B22F 7/02 219/73.21 |
| 2015/0346404 A1 | * | 2/2015 | Subramanian | B23K 26/345 219/73.21 |

FOREIGN PATENT DOCUMENTS

| | | |
|---|---|---|
| CN | 201300207 Y | 9/2009 |
| CN | 101780544 A | 7/2010 |
| JP | 4-33782 A | 2/1992 |
| JP | 7-502938 A | 3/1995 |
| JP | 2003-160825 A | 6/2003 |
| JP | 2004-232043 A | 8/2004 |
| RU | 2 132 761 C1 | 7/1999 |
| RU | 2 217 265 C2 | 11/2003 |
| RU | 2 217 266 C2 | 11/2003 |
| RU | 2 417 890 02 | 5/2011 |

OTHER PUBLICATIONS

Combined Office Action and Search Report issued Aug. 23, 2018 in Russian Patent Application No. 2016127130/02. (with English translation of the Office Action and English translation of Categories of Cited Documents), 10 pages.

Shishkovsky I. V. "Selective laser sintering and synthesis of functional structures", Abstract of dissertation for the degree of Doctor of Physical and Mathematical Sciences, Samara Branch of the Physical Institute. P.N. Lebedev, Russian Academy of Sciences, ISMAN Printing House, Chernogolovka, 2005, 47 pages.

Office Action issued Oct. 30, 2018 in Japanese Patent Application No. 2016-536645, 6 pages (submitting English translation only).

I.V. Shishkovsky, et al., "Surface Laser Sintering of Exothermic Powder Compositions; A thermal and SEM/EDX study," Journal of Thermal Analysis and Calorimetry, vol. 91, No. 2, XP019577809, Oct. 13, 2007, pp. 427-436.

International Search Report issued Mar. 11, 2015 in PCT/FR2014/053169 filed Dec. 4, 2014.

French Search Report issued Oct. 17, 2014 in FR 1362253 filed Dec. 6, 2013.

* cited by examiner

METHOD FOR PRODUCING A PART BY SELECTIVE MELTING OF POWDER

TECHNICAL FIELD

The present disclosure relates to a method of fabricating a part by selectively melting powder.

BACKGROUND

Methods are already known for fabricating parts by selectively melting powder. These methods consist in fabricating a part by superposing layers of powder, the layers being deposited and melted locally one after the other by means of a laser beam or an electron beam passing over the surface of each layer. The path followed by the laser on each layer is determined by a system in which the three-dimensional coordinates of the points of the successive layers that are to be made have been recorded. These methods are known under the denominations "direct metal laser sintering", "selective laser melting", "laser beam melting", or "electron beam melting".

Known examples of methods of this type are described in the following patent documents: WO 2012/160291 A1, WO 2013/060981 A2, and FR 2 982 182 A1.

In those methods, melting the powder in each of the layers requires a very large amount of beam energy and a certain amount of time corresponding to the transit time of the beam on the layer. The cost of fabricating a part using these methods is thus relatively high, in particular because of the energy consumption associated with producing a high energy beam. In addition, the fabrication time is relatively long, in particular because of the large number of passes of the beam.

There therefore exists a need for a new type of method.

The paper "Surface laser sintering of exothermic power compositions: A thermal and SEM/EDX study", Journal of Thermal Analysis and calorimetry, Vol. 91 (2008), no. 2, pages 427-436, by I. V. Shishkovsky et al., discloses a method wherein a laser beam is moved over a single powder layer comprising a mixture of nickel and aluminum powders. The energy given off by the laser beam initiates an exothermic reaction between nickel and aluminum.

GENERAL SUMMARY

The present description relates to a method of fabricating a part by selectively melting powder, the method comprising the following steps:
  depositing a first layer of a first powder having a first element as its main element;
  depositing, on the first layer, a second layer of a second powder having a second element as its main element, which second element is different from the first element; and
  moving a first energy beam, e.g. a laser beam or an electron beam, over the second layer, the energy delivered by the first beam serving to initiate an exothermic reaction between the first element and the second element, the energy given off by the exothermic reaction acting to locally melt together the first and second layers.

In this method, the energy needed for the local melting (or selective melting) of the second layer is provided by the exothermic reaction that is triggered. Consequently, the energy delivered by the first beam can be selected to be less than the energy needed for locally melting the second layer, while still being sufficient for initiating said exothermic reaction.

The energy delivered by the first beam to a certain zone of the second layer depends on the power of the beam and on the speed with which it passes over the zone. Reducing the energy required thus makes it possible to reduce the power of the beam and/or to increase the travel speed of the beam. The method thus makes it possible to reduce the energy consumption associated with producing the beam, by reducing the power of the beam, and/or to increase the travel speed of the beam over the second layer. This results in a reduction in fabrication costs and/or in an increase in the production rate of the part.

Furthermore, since the energy needed for the local melting of the first layer is also provided by the exothermic reaction that is triggered, it is possible to omit passing the energy beam over the first layer. This also makes it possible to reduce production costs, by reducing energy consumption, and/or to increase production rate by reducing the total number of passes of the beam. In particular, this number of passes may be halved compared with conventional methods.

In certain implementations, a second energy beam is moved over the first layer prior to depositing the second layer, the energy delivered by the second beam acting to superficially and locally melt the first layer. Such a surface melting serves in particular to consolidate the first layer in order to facilitate depositing the second layer thereon. The idea is to melt only the powder that is located at the surface of the first layer and not to melt the powder throughout the entire thickness of the first layer. The energy delivered by the second beam can therefore be selected to be less than the energy needed for localized total melting of the first layer, while still being sufficient to cause localized melting at its surface. Under such circumstances, and compared with conventional methods, energy consumption is lower and/or production rate is higher.

Such a method finds a particular application in fabricating metal parts. The term "metal part" should be understood as covering a part made of pure metal, of metal alloy, or of cermet. The parts may comprise metal parts that are to be subjected to high temperatures in operation, and in particular metal parts made of refractory alloy. Specifically, these parts are difficult to fabricate correctly by foundry or casting methods: it is found that there are problems of chemical interaction with molds, of affinity between certain elements constituting the cast alloy with oxygen, of solidification rates that are too fast, etc., that often lead to an alloy that is out of equilibrium, presenting a microstructure that is disordered and significant metallurgical defects (shrinkage, segregating, cracking, etc.). In contrast, the proposed fabrication method makes it possible obtain parts of homogeneous microstructure and composition, of good metallurgical quality, and/or having good toughness at ambient temperature.

In particular, such a method may be used for fabricating a turbomachine part. Without being limiting, the part under consideration may be a portion of a high or low pressure turbine of an aircraft turbojet. For example, it may be a turbine blade.

In addition to the above-mentioned features, the method may present one or more of the following features, considered individually or in any technically feasible combination:
  the first powder is a metal powder;
  the second powder is a metal powder;

the first element, i.e. the main or majority element of the first powder is selected from the following elements: Nb, Mo, Ti, V, Ta, Cr, Fe, Co, Ni;

the first element is Mb, Mo, or Ti, and in particular the first powder is a powder of an alloy containing a majority of the elements Nb, Mo, or Ti in association with other transition metals;

the first powder is a powder of a metal alloy containing addition elements selected from the following elements: Si, Ti, Cr, Al, Hf, Mo, Sn, B, if the first element is Nb or Mo, and addition elements selected from the following elements: Al, Nb, Cr, Ta, W, Mo, B, Hf, Zr, V if the first element is Ti;

the second element, i.e. the main or majority element of the second powder is selected from the following elements: Si or Al;

the second powder is a powder of Si or a powder of Al; and the exothermic reaction takes place between the first element and Si or Al, and causes silicides or aluminides to be formed.

Since the reactions for forming silicides or aluminides are strongly exothermic, they make it possible to act locally to melt together the first and second powders having the above-specified compositions.

The features and advantages of the method, and others, appear on reading the following detailed description of implementations. This detailed description refers to the accompanying drawings.

BRIEF DESCRIPTION OF THE DRAWING

The accompanying drawings are schematic and not to scale, and they seek above all to illustrate the principles of the invention.

In the drawing, from one figure to another, elements (or portions of an element) that are identical are identified by the same reference signs.

DETAILED DESCRIPTION OF IMPLEMENTATIONS

Implementations are described below in detail with reference to the accompanying drawing. These implementations show the features and the advantages of the invention. It should nevertheless be recalled that the invention is not limited to these implementations.

Figure 1:
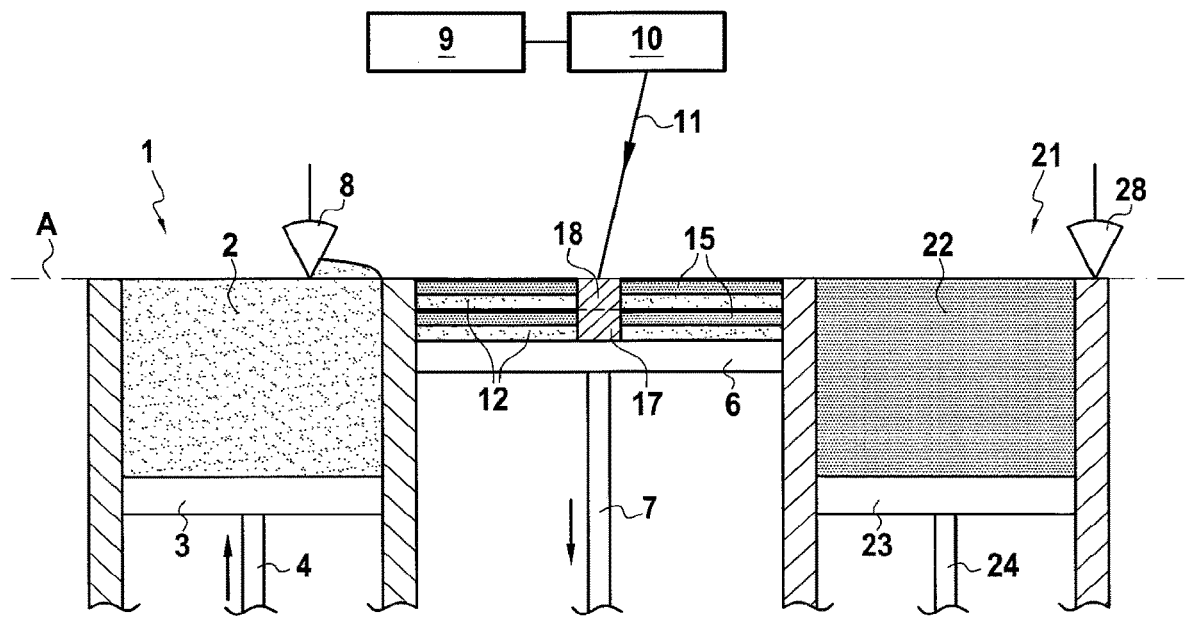
FIG. 1 shows an example of an installation for performing the method.

An example installation for fabricating a part by selectively melting powder is shown in FIG. 1. It comprises:

a first tank 1 containing a first powder 2 and whose bottom wall 3 is mobile and movable in translation;

a second tank 21 containing a second powder 22 and whose bottom wall 23 is mobile and movable in translation; and a vessel 5 situated between the tanks 1 and 21 and having a bottom wall 6 that is likewise movable in translation.

In the example, each of the bottom walls 3, 23, and 6 is constituted by a plate constrained to move in translation with the rod 4, 7, 24 of a respective actuator, e.g. of a hydraulic cylinder.

The installation has a wiper 8 or a roller serving to bring a quantity of powder 2 from the tank 1 to the vessel 5, by moving on a horizontal plane A, and a wiper 28 or roller enabling a quantity of powder 22 to be brought from the tank 21 to the vessel 5, by moving on the horizontal plane A. The installation also comprises means 9 for generating a laser beam or an electron beam, which means are coupled to a device 10 for orientating and moving the beam 11.

The steps of fabricating a part using this installation are as follows.

Firstly, the bottom 3 of the tank 1 is moved upwards so that a certain quantity of the first powder 2 is situated above the horizontal plane A. The wiper 8 is then moved from left to right (with reference to FIG. 1) so as to wipe said powder 2 at the top of the tank 1 and bring it into the vessel 5. The quantity of powder 2 and the position of the bottom wall 6 in the vessel 5 are determined so as to form a first layer 12 of powder having a thickness that is selected and constant.

Figure 2:
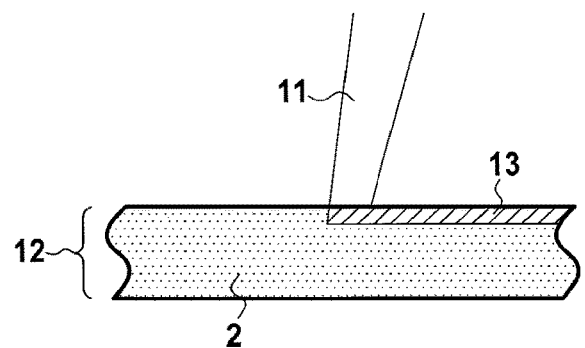
FIGS. 2 and 3 are diagrams schematically showing different steps of the method.

As shown in FIG. 2, a laser beam or an electron beam 11 then scans a determined zone of the layer 12 so as to locally and superficially melt the surface of the first powder 2 in the layer 12 at the locations that are scanned by the beam. The molten zones solidify and form a skin 13 at the surface of the layer 12. It should be observed that this step of forming the skin 13 is optional.

The bottom wall 6 of the vessel 5 is then lowered.

The bottom wall 23 of the tank 21 is moved upwards so that a certain quantity of the second powder 22 is situated above the horizontal plane A. The wiper 28 is then moved from right to left (with reference to FIG. 1) so as to wipe said powder 22 at the top of the tank 21 and bring into the vessel 5, in a first layer 12. The quantity of powder 22 and the position of the bottom wall 6 of the vessel 5 are determined so as to form a second layer 15 of powder having a thickness that is selected and constant.

Figure 3:
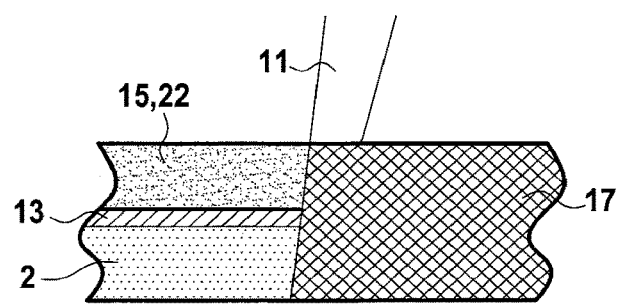

As shown in FIG. 3, a laser beam or an electron beam 11 then scans a determined zone of the second layer 15 so as to melt together the first and second layers 12, 15 in the scanned zone. The molten zones solidify and form a first layer of material 17.

The bottom wall 6 is lowered and a new layer 12 of powder 2 and a new layer 15 of powder 22 are brought in succession in the same manner as above onto the first layer of material 17. By controlled movement of the beam 11, a second layer of material 18 is formed on the first layer of material 17, as shown in FIG. 1.

These operations are repeated until the complete part has been made by superposing numerous layers of material.

By way of example, the fabricated part is a metal part that is to be subjected to high temperatures in operation, more particularly temperatures higher than 600° C., e.g. temperatures lying in the range 600° C. to 1500° C. or to temperatures higher than 1500° C. This type of part is referred to below as a "refractory" part. The maximum operating temperature that the part can withstand naturally depends on the nature of the alloy used.

By way of example, the first powder 2 is a metallic powder of a niobium- (Nb) or molybdenum- (Mo) based alloy. These alloys have the advantage of presenting melting points that are very high, higher than those of the superalloys presently in use for fabricating refractory parts. Furthermore, Nb-based alloys make it possible to significantly reduce the weight of the fabricated part because of their low density (compared with nickel-based superalloys), while conserving good mechanical properties. Such advantages are advantageous, notably in the field of aeronautics.

The above-mentioned niobium-based alloys may for example contain one or more addition elements selected from the following elements: silicon (Si), titanium (Ti), chromium (Cr), aluminum (Al), hafnium (Hf), molybdenum (Mo), tin (Sn), etc. The above-mentioned molybdenum-based alloys may for example contain one or more of the following addition elements selected from silicon, (Si), boron (B), and zirconium (Zr).

By way of example, the second powder 22 is a powder based on silicon. For example, the content by weight of silicon in the powder is greater than 80%, and may be close to 100%.

In another example, the first powder 2 is a metal powder of an alloy based on titanium (Ti). This titanium-based alloy may for example contain one or more addition elements selected from the following elements: aluminum (Al), niobium (Nb), chromium (Cr), tantalum (Ta), tungsten (W), molybdenum (Mo), boron (B), hafnium (Hf), zirconium (Zr), vanadium (V), etc. By way of example, the second powder 22 is then a powder based on aluminum (Al), even though a powder based on silicon (Si) is also conceivable.

The grain size of the second powder 22 may be smaller than the grain size of the first powder 2. The grain size of the first powder 2 may lie in the range 20 micrometers (μm) to 60 μm.

Among other advantages, the second powder 22 presents the advantage of having a melting temperature that is considerably lower than that of the first powder 2. The second powder 22 can also serve to "plug" any cracks within the layers of material while they are being formed.

The implementations or embodiments described in the present description are given by way of non-limiting illustrations, and the person skilled in the art can easily, in the light of this description, modify these implementations or embodiments or can contemplate others, while remaining within the ambit of the invention.

Furthermore, the various features of these implementations or embodiments may be used singly or in combination with one another. When they are combined, these features may be combined as described above or differently, the invention not being limited to the specific combinations described in the present description. In particular, unless otherwise specified, a feature described with reference to any one implementation or embodiment may be applied in analogous manner to any other implementation or embodiment.

The invention claimed is:

1. A method of fabricating a part by selectively melting powder, the method comprising reiterating following steps until the part is obtained:
   depositing a first layer of a first powder having a first element as a main element of the first powder by moving a bottom wall of a first tank containing the first powder upward so that a predetermined amount of the first powder is situated above a horizontal plane at a top of the first tank, and then moving a first wiper or a first roller to move the first powder into a vessel, the first layer of the first powder having a constant predetermined thickness;
   lowering a bottom wall of the vessel;
   depositing a second layer of a second powder having a second element as a main element of the second powder on top of the first layer of the first powder by moving a bottom wall of a second tank containing the second powder upward so that a predetermined amount of the second powder is situated above the horizontal plane, and then moving a second wiper or a second roller to move the second powder into the vessel, the second layer of the second powder having a constant predetermined thickness, wherein the second element is different from the first element; and
   moving an energy beam over a determined zone of the second layer of the second powder, energy delivered by the energy beam being less than energy required for locally melting of the second layer of the second powder and serving to initiate an exothermic reaction between the first element and the second element, in which energy given off by the exothermic reaction acts to locally melt together the first layer of the first powder and the second layer of the second powder so as to form a layer of material of the part,
   wherein the vessel is disposed between the first tank and the second tank.

2. The method according to claim 1, wherein:
   the first element is selected from the following elements: Nb, Mo, V, Ta, Cr, Fe, Co, Ni;
   the second element is selected from the following elements: Si or Al; and
   the exothermic reaction takes place between the first element and Si or Al, and causes silicides or aluminides to be formed.

3. The method according to claim 1, wherein the first element is Nb or Mo.

4. The method according to claim 1, wherein the second element is Si.

5. The method according to claim 1, wherein:
   the first element is Ti;
   the second element is selected from the following elements: Si or Al; and
   the exothermic reaction takes place between the first element and Si or Al, and causes silicides or aluminides to be formed.

6. The method according to claim 5, wherein the second element is Al.

7. The method according to claim 1, wherein the method is applied to fabricating a metal part that is to be subjected to operating temperatures lying in the range 600° C. to 1500° C. or higher than 1500° C.

8. The method according to claim 1, wherein the method is applied to fabricating a turbomachine part.

9. The method according to claim 1, wherein the energy beam is a laser beam or an electron beam.

10. The method according to claim 1, further comprising, prior to the depositing the second layer of the second powder on the first layer of the first powder, moving the energy beam over the first layer of the first powder to locally and superficially melt the first layer of the first powder so as to form a skin at a surface of the first layer of the first powder.

11. The method according to claim 10, wherein the energy beam is a laser beam or an electron beam.

12. The method of claim 1, wherein a melting temperature of the second powder is lower than a melting temperature of the first powder.

13. A method of fabricating a part by selectively melting powder, the method comprising reiterating following steps until the part is obtained:
   depositing a first layer of a first powder having a first element as a main element of the first powder by moving a bottom wall of a first tank containing the first powder upward so that a predetermined amount of the first powder is situated above a horizontal plane at a top of the first tank, and then moving a first wiper or a first roller to move the first powder into a vessel, the first layer of the first powder having a constant predetermined thickness;
   lowering a bottom wall of the vessel;
   depositing a second layer of a second powder having a second element as a main element of the second powder on top of the first layer of the first powder by moving a bottom wall of a second tank containing the second powder upward so that a predetermined amount of the second powder is situated above the horizontal plane, and then moving a second wiper or a second roller to move the second powder into the vessel, the second layer of the second powder having a constant predetermined thickness, wherein the second element is different from the first element; and moving an energy beam over a determined zone of the second layer of the second powder, energy delivered by the energy beam being able to melt the second layer of the second powder, and the energy delivered by the energy beam serving to initiate an exothermic reaction between the first element and the second element, in which energy given off by the exothermic reaction acts to locally melt together the first layer of the first powder and the second layer of the second powder so as to form a layer of material of the part, wherein the vessel is disposed between the first tank and the second tank.

14. The method of claim 13, wherein a melting temperature of the second powder is lower than a melting temperature of the first powder.

\* \* \* \* \*